(12) United States Patent
Duewer et al.

(10) Patent No.: US 10,074,378 B2
(45) Date of Patent: Sep. 11, 2018

(54) DATA ENCODING DETECTION

(71) Applicant: Cirrus Logic International Semiconductor Ltd., Edinburgh (GB)

(72) Inventors: Bruce E. Duewer, Austin, TX (US); Dylan A. Hester, Austin, TX (US); Shafagh Kamkar, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 15/373,745

(22) Filed: Dec. 9, 2016

(65) Prior Publication Data
US 2018/0166088 A1      Jun. 14, 2018

(51) Int. Cl.
*G10L 19/16*      (2013.01)
*G10L 19/22*      (2013.01)
*G06F 3/16*       (2006.01)

(52) U.S. Cl.
CPC ............ *G10L 19/167* (2013.01); *G06F 3/165* (2013.01); *G10L 19/22* (2013.01)

(58) Field of Classification Search
CPC ..................................................... G10L 19/22
See application file for complete search history.

(56) References Cited

U.S. PATENT DOCUMENTS

| | | | | |
|---|---|---|---|---|
| 6,138,051 A * | 10/2000 | Dieterich | ................ | G10L 25/69 381/58 |
| 6,205,223 B1 | 3/2001 | Rao et al. | | |
| 7,113,907 B2 | 9/2006 | Duewer | | |
| 7,333,930 B2 * | 2/2008 | Baumgarte | ........... | G10L 19/032 704/200.1 |
| 2004/0033057 A1 * | 2/2004 | Kojo | ...................... | G11B 20/10 386/232 |
| 2004/0213350 A1 * | 10/2004 | Frith | ...................... | H04B 14/04 375/242 |
| 2005/0010399 A1 * | 1/2005 | Duewer | ........... | G11B 20/10527 704/212 |
| 2007/0017475 A1 | 1/2007 | Ihara et al. | | |

(Continued)

FOREIGN PATENT DOCUMENTS

WO      2004/051982 A1      6/2004

OTHER PUBLICATIONS

DSD Disc Format Specification, Sony Corporation, Jan. 31, 2006.
(Continued)

*Primary Examiner* — Brian Louis Albertalli
(74) *Attorney, Agent, or Firm* — Norton Rose Fulbright US LLP

(57) ABSTRACT

A data encoding may be determined by examining the data itself. By examining the data, such as by identifying characteristics of the data, the data encoding may be identified and the substantive information extracted from the data by decoding the data according to the identified data encoding. The data encoding may be identified without extra control or header information separate from the encoded data itself. The identification of data encoding may be determined by a plurality of detectors examining different characteristics of the data and determining an encoding of the data based on each of those individual characteristics. The output of the detectors may be collected and used to decide the encoding of the data. One example application involves determining if audio data is DSD- or PCM-encoded audio data by examining only the data itself.

23 Claims, 8 Drawing Sheets

(56) References Cited

U.S. PATENT DOCUMENTS

| | | | |
|---|---|---|---|
| 2007/0174756 A1* | 7/2007 | Yoneda | G11B 20/10 |
| | | | 714/768 |
| 2008/0140392 A1 | 6/2008 | Kim | |
| 2009/0287493 A1* | 11/2009 | Janssen | G11B 20/10481 |
| | | | 704/500 |
| 2010/0042740 A1 | 2/2010 | Bhattacharya | |
| 2010/0070272 A1 | 3/2010 | Lee et al. | |
| 2010/0312567 A1 | 12/2010 | Oh et al. | |
| 2013/0236032 A1 | 9/2013 | Wakeland et al. | |
| 2014/0052454 A1 | 2/2014 | Lien | |
| 2016/0086611 A1* | 3/2016 | Tachimori | G06F 3/16 |
| | | | 704/500 |
| 2016/0232903 A1 | 8/2016 | Choo | |
| 2017/0076734 A1* | 3/2017 | Subasingha | G10L 19/06 |

OTHER PUBLICATIONS

DSF File Format Specification, Sony Corporation, Nov. 11, 2005.
Koch et al. DoP open Standard, Method for transferring DSD Audio over PCM Frames Version 1.1, Mar. 30, 2012.

\* cited by examiner

DATA ENCODING DETECTION

FIELD OF THE DISCLOSURE

The instant disclosure relates to communication of data. More specifically, portions of this disclosure relate to determining an encoding of data being communicated.

BACKGROUND

Multiple data formats may be transmitted over data lines in computer circuitry or communications systems. A receiving device or receiving user needs to know the data format of the received data to correctly decode the received data to acquire the information being transmitted. In some conventional systems, a type of communication line or circuitry line is determinative of the format of data being conveyed over that communication line or circuitry line. For example, when a Serial-ATA hard drive is connected through a cable to a computer motherboard, the circuitry on the motherboard can expect that data transferred through the cable is formatted according to the specifications of the Serial-ATA interface.

In other conventional systems that have multi-purpose data lines or communications lines, extra information is transmitted along with the data and that extra information may be used to determine the encoding of received data. When the encoding is determined, the information in the data may be acquired. Some examples of such extra information are shown in and described with reference to FIG. 1 and FIG. 2.

One example technique for including extra information is to attach a header to data. FIG. 1 is an illustration for a data format having a header attached to payloads according to the prior art. Data 102 may include a header 102A and a payload 102B; data 104 may include a header 104A and a payload 104B. The data 102 and 104 may be communicated over the same data line or communications line while being differently formatted. When a receiver receives the data 102 and 104, the receiver may examine the header 102A to identify an encoding of payload 102B and may examine the header 104A to identify an encoding of payload 104B. After identifying the encoding format indicated in header 102A, the receiver may decode the payload 102B accordingly. The headers 102A and 104A provide an indication of the encoding of the data, however the headers 102A and 104A consume transmission resources without conveying substantive information. Instead, transmission resources are consumed to send the necessary control information. Thus, the use of headers in this manner is inefficient. When the payload is audio data, the use of the headers reduces available bandwidth for audio data and can decrease the quality of the audio.

Another example technique for including extra information is to convey the extra information in a control line separate from the data line. FIG. 2 is an illustration for a data format having control data attached to payloads according to the prior art. A sending device 112A may transmit information to a receiving device 112B over data lines 114A and control lines 114B. The substantive information may be encoded as payloads 116 and transmitted over the data lines 114A. Information indicative of an encoding of the payloads 116 may be transmitted as control information 118 over the control lines 114B. The receiving device 112B uses the data encoding indication in the control information 118 to decode the payload 116. The separation of control information 118 from the payload 116 allows substantive information to be transmitted quicker over the data lines 114A without the need for the header 102A of FIG. 1. However, the additional control lines 114B require additional space on a circuit board or additional communications lines. Furthermore, the receiving device 112B requires additional pin connections for the control lines 114B and the receiving device 112B requires a manner for synchronizing the control information 118 with the payloads 116.

Each of these conventional solutions is a technique for allowing different encodings of data over a data line or communications line. One example situation that requires such a capability is an audio device supporting multiple audio formats. For example, an audio system may accept digital audio as either pulse code modulated (PCM) digital data or direct stream digital (DSD) digital data. Rather than include two separate data paths and switch between the two data paths, DSD digital data may be transmitted as DSD over PCM (DoP) data, in which the DSD data is transmitted as if the DSD data was PCM data. The receiving audio system must be informed when the incoming data is DSD data and when the data is PCM data. That indication would conventionally be provided using one of the conventional techniques described above. However, providing that extra information can degrade system performance and increase system cost due to required space.

Shortcomings mentioned here are only representative and are included simply to highlight that a need exists for improved electrical components, particularly for data transmission and processing employed in consumer-level devices, such as personal media devices (e.g., smart phones). Embodiments described herein address certain shortcomings but not necessarily each and every one described here or known in the art. Furthermore, embodiments described herein may present other benefits than, and be used in other applications than, those of the shortcomings described above.

SUMMARY

Data encoding may be determined by examining the data itself. By examining the data, such as by identifying characteristics of the data, the data encoding may be identified and the substantive information extracted from the data. In some examples, no information outside of the data itself may be required to identify the encoding of the data. An accuracy of the determination may be improved by examining multiple aspects of the data itself, such as multiple characteristics of the data. Each aspect of the data may provide an indication, although sometimes a not completely accurate indication, that can be used to determine the data encoding. Multiple indications based on different criteria may provide a useful indication of the data encoding format. For example, a voting process may be used such that a data encoding is identified based on a majority of the aspects of the data indicating a particular encoding.

In some embodiments, the data encoding determination may be used to identify an encoding of audio data. The audio data may be received as, for example, either a one-bit (e.g., DSD) data or PCM data, each of which are digital data formats for audio. The characteristics of the data, such as presence of particular data patterns in the data, presence of certain frequency-domain characteristics in the data, and/or presence of protocol violations in the data patterns, may be used to identify the audio data as either PCM or DSD data. By being able to identify the audio data encoding without extra control information, a single data path into the audio system may be used for alternating between PCM and DSD data playback. For example, during a first time period PCM data may be transmitted to the audio system over a data line and during a second time period DoP (DSD over PCM) data may be transmitted to the audio system on the same data line.

Electronic devices incorporating the data encoding identification techniques and systems described herein may benefit from the ability to identify different encodings of data transmitted over a shared data bus. In some embodiments, the data encoding identification techniques and system may be integrated into a digital-to-analog converter (DAC) as part of an audio playback path. The DAC may be used to convert a digital signal, such as a digital audio signal, to an analog signal that reproduces the sounds represented by the digital audio data. Such a DAC, or a similar analog-to-digital converter (ADC), may be used in electronic devices with audio outputs, such as music players, CD players, DVD players, Blu-ray players, headphones, portable speakers, headsets, mobile phones, tablet computers, personal computers, set-top boxes, digital video recorder (DVR) boxes, home theatre receivers, infotainment systems, automobile audio systems, and the like. However, the data encoding identification techniques and systems are not limited to processing audio data, but may be applied to data containing different information.

One example technique for identifying an encoding of data may include the steps of receiving a data stream, analyzing the data stream with a plurality of detectors configured to generate a corresponding plurality of determinations regarding the data stream, and identifying the encoding of the received data stream based, at least in part, on the plurality of determinations from the plurality of detectors.

One example system that may include functionality for identifying an encoding of data may include a processor configured to perform steps including receiving a data stream, analyzing the data stream with a plurality of detectors configured to generate a corresponding plurality of determinations regarding the data stream, and identifying the encoding of the received data stream based, at least in part, on the plurality of determinations from the plurality of detectors. In some embodiments, the system may be a processor, such as a digital signal processor (DSP), configured to process an audio data stream. A processor of such an example system may also be configured to perform other functionality, such as decoding the audio data stream, processing the audio data stream, applying an equalizer to the decoded audio of the audio data stream, applying adaptive noise cancellation (ANC) to the decoded audio, processing microphone input, processing user input, and/or processing data for other applications.

Another example system that may include functionality for identifying an encoding of data may include an input node configured to receive an audio data stream, a plurality of playback paths configured to playback a corresponding plurality of encodings of audio data of the audio data stream, a plurality of detectors configured to analyze the audio data stream and generate a corresponding plurality of determinations of an encoding for the received audio data stream, a selector circuit coupled to the plurality of playback paths and the plurality of detectors and configured to select an output of at least one of the plurality of playback paths based, at least in part, on the plurality of determinations from the plurality of detectors. In some embodiments, the system may be configured to process an audio data stream. Such an example system may be included in a digital-to-analog converter (DAC) or an audio controller, which may be included in an electronic device such as a personal media player (e.g., smart phone).

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 3:
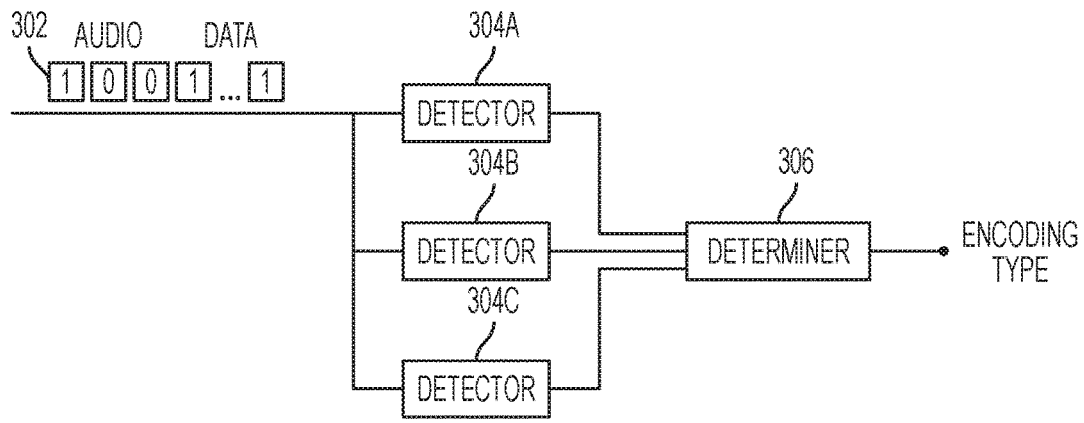
FIG. 3 is a block diagram illustrating a system for determining data encoding according to some embodiments of the disclosure.

An identification of a data encoding for a data stream may be performed by one or more detectors that each examine certain aspects of the audio data stream in conjunction with a determiner that uses the output of the one or more detectors to determine the data encoding type. When the data stream includes an audio data stream, the detectors may be configured to examine certain aspects of the audio data stream that may be useful in determining an encoding of the audio data stream. A block diagram illustrating a configuration for determining encoding type is shown in FIG. 3. FIG. 3 is a block diagram illustrating a system for determining data format according to some embodiments of the disclosure. Audio data 302 may be input to a plurality of detectors 304A-C. The detectors 304A-C may examine aspects of the audio data 302 to determine a likely encoding type of the audio data 302 according to each aspect. One example detector may examine the audio data 302 for protocol violations. If the audio data may be PCM or DSD data, a detector may decode the audio data 302 and determine if decoding the audio data 302 according to PCM or one-bit (e.g., DSD) protocols results in more errors. If more PCM errors are detected than DSD errors, the detector may determine that the audio encoding is DSD. Other examples of detectors are described in further detail below. Each of the detectors 304A-C may produce an output indicating a likely data encoding for the audio data 302. A determiner 306 may receive the outputs of the detectors 304A-C and determine the data encoding based on the cumulative outputs of the detectors 304A-C. As one example, the determiner 306 may determine an encoding type of the audio data by a majority vote from the detectors 304A-C.

Figure 4:
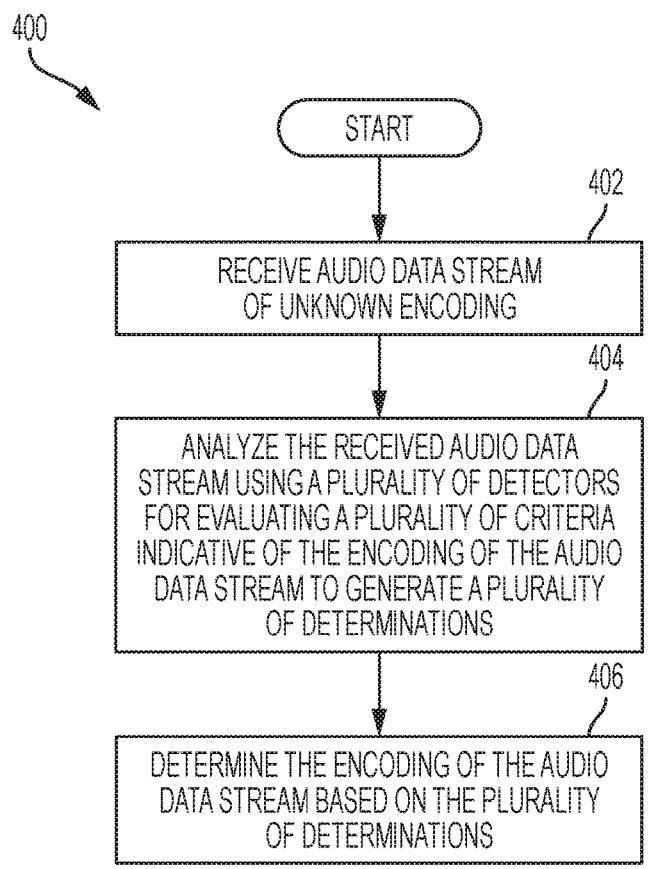
FIG. 4 is a flow chart illustrating an example method for determining data encoding according to some embodiments of the disclosure.

A method of determining an audio data stream encoding is shown in FIG. 4. FIG. 4 is a flow chart illustrating an example method for determining data format according to some embodiments of the disclosure. The method 400 may begin at block 402 with receiving an audio data stream of unknown encoding. Then, at block 404, the received audio data stream may be analyzed using one or more detectors for evaluating a plurality of criteria indicative of the encoding of the audio data stream to generate a plurality of determinations. Next, at block 406, a determination may be made regarding the encoding of the audio data stream based on the plurality of determinations from block 404.

When a determination is made for the audio encoding, the determiner may cause the reproduction of sounds encoded in the audio data stream to be played back to a user. In one example, the determiner may cause a playback path to switch between configurations for decoding the audio data stream. That is, if DSD encoding is determined, then the playback path may be configured for DSD playback, and if PCM encoding is determined, then the playback path may be configured for PCM playback. In another example, playback paths may be fixed and the determiner controls a multiplexer that selects or mutes playback paths in favor of a selected playback path. One example circuit block diagram for such a system is shown in FIG. 5.

Figure 5:
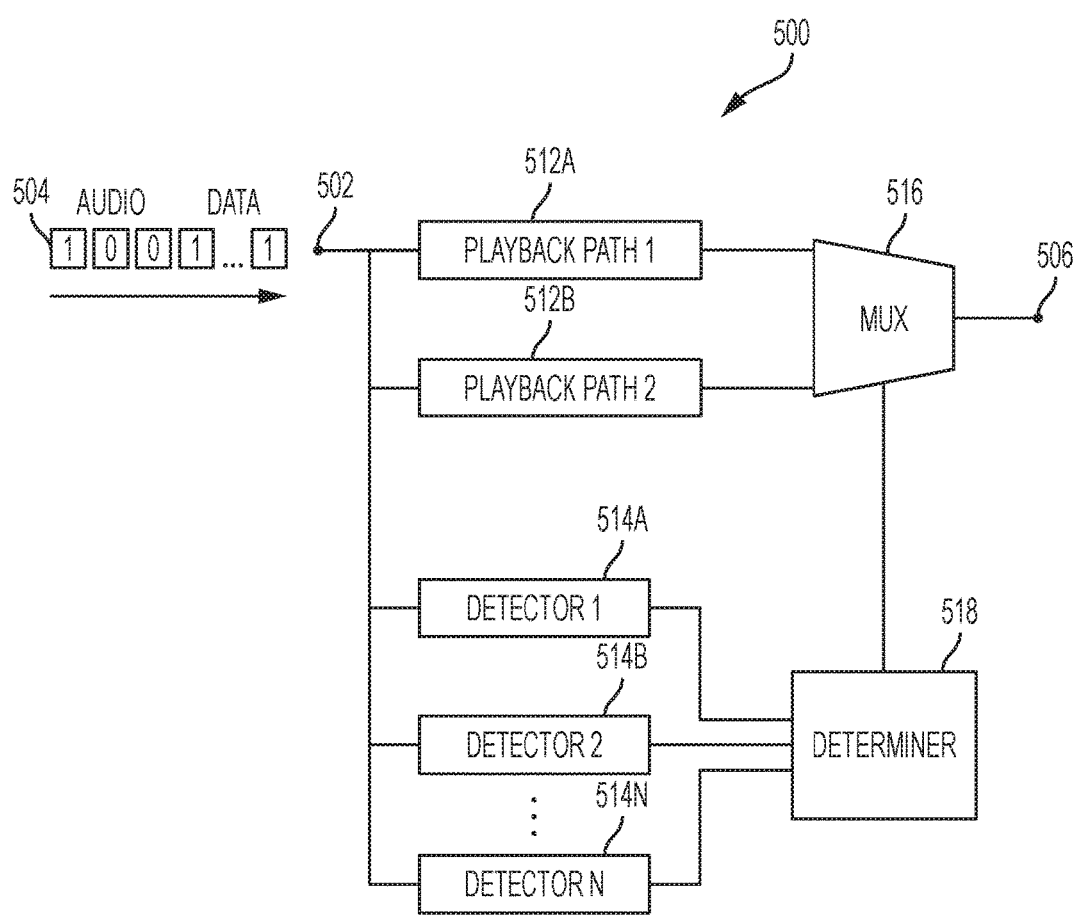
FIG. 5 is a block diagram illustrating a system for determining data format and controlling playback based on the determined data encoding according to some embodiments of the disclosure.

FIG. 5 is a block diagram illustrating a system for determining data format and controlling playback based on the determined data format according to some embodiments of the disclosure. A system 500 may receive audio data 504 at input node 502. Detectors 514A-N may receive the audio data 504 and examine aspects of the audio data 504 to determine whether certain aspects are indicative of the audio data 504 having a certain encoding, such as DSD or PCM encoding. Playback paths 512A-B may also receive the audio data 504, and each decode the audio data 504 according to a specific encoding. For example, playback path 512A may decode the audio data 502 according to a PCM encoding, and playback path 512B may decode the audio data 504 according to a DSD encoding. In another example, playback path 512A may decode a first type of PCM data and playback path 12B may decode a second type of PCM data. A multiplexer 516 may receive the decoded audio from the playback paths 512A-B and select one for output to an output node 506. The output of the multiplexer 516 may be selected by a determiner 518, which selects an output based on the outputs of the detectors 514A-N.

Figure 6:
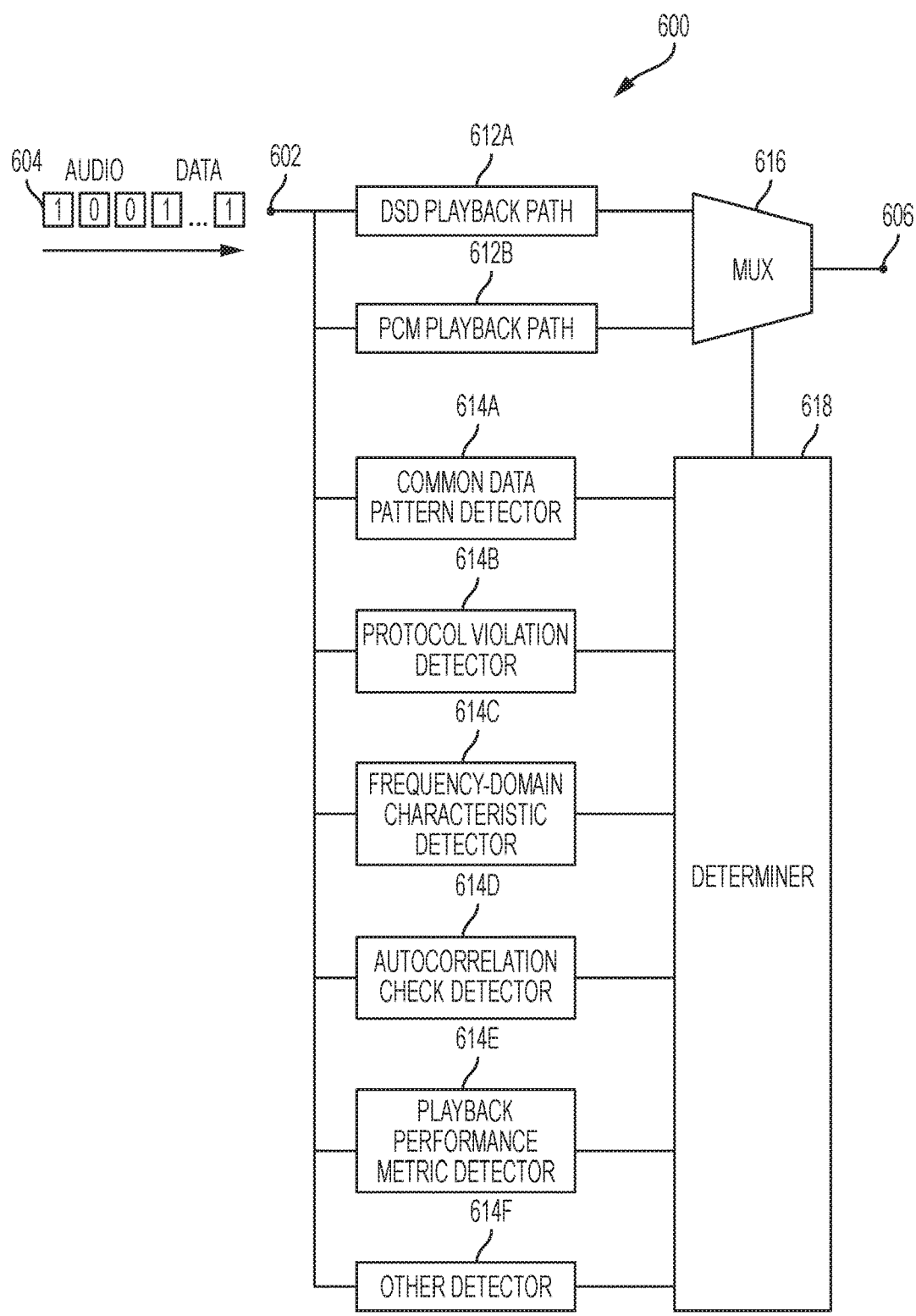
FIG. 6 is a block diagram illustrating a system for determining whether an audio data format is DSD or PC and controlling playback based on the determined data encoding according to some embodiments of the disclosure.

One specific application for a system illustrated in FIG. 5 is determining an audio encoding of DSD or PCM in a personal media player supporting playback of multiple audio formats. A system for determining audio data encoding as DSD or PCM audio data is described with reference to FIG. 6. FIG. 6 is a block diagram illustrating a system for determining whether an audio data format is DSD or PCM and controlling playback based on the determined data format according to some embodiments of the disclosure. An input node 602 may receive audio data 604 from an audio data stream. The audio data stream may be retrieved from a high-definition music file stored in memory. The audio data 604 may be provided to DSD playback path 612A and PCM playback path 612B. The playback paths 612A-B decode the audio data 604 according to the DSD and PCM protocols, respectively, and generate an output. Only one of the outputs from playback paths 612A-B will contain the correct sounds corresponding to the original music file. Thus, the multiplexer 616 will select one of the playback paths 612A-B for output to output node 606. The multiplexer 616 is controlled by determiner 618, which receives determinations from detectors 614A-F. Detectors 614A-F may also receive the audio data 604, determine whether certain aspects of the audio data 604 indicate DSD or PCM data encoding, and output a determination to the determiner 618. The determiner 618, based on the outputs of the detectors 614A-F, may control multiplexer 616 to select an output of either the DSD playback path 612A or the PCM playback path 612B. Although several detectors 614A-F are illustrated in the system 600, some of the detectors 614A-F may be optional. Furthermore, other detector configurations may be included in the system 600.

Examples for detectors 614A-F are shown in the system 600, but are not exclusive of the possible detectors that may be included in the system 600. Common data pattern detector 614A may determine if audio data is likely PCM- or DSD-encoded data by examining the audio data for data patterns that frequently occur in PCM- or DSD-encoded data, such as a strict 50/50 ratio of 1's and 0's in muted DSD-encoded data. Protocol violation detector 614B may determine a number of protocol violations when audio data is PCM-interpreted or DSD-interpreted and determine if the audio data is likely PCM- or DSD-encoded data based on which interpretation results in fewer protocol violations or which protocol is violated. One example of a protocol violation is a 1's density in DSD-encoded data that does not meet protocol requirements. Frequency-domain characteristic detector 614C may determine frequency content in audio data when interpreted as PCM and/or DSD. For example, a Fast Fourier Transform (FFT) may be applied to the audio data interpreted as PCM-encoded data, and if the energy is concentrated in the audio band, then the audio data is likely PCM-encoded data, but if the energy is spread across the spectrum, then the audio data is likely DSD-encoded data. As another example, a Fast Fourier Transform (FFT) may be applied to the audio data interpreted as DSD-encoded data, and if the energy concentrated above 50 kHz is consistent with 1-bit quantization error, then the audio data is likely DSD-encoded data, but otherwise, the audio data is likely PCM-encoded data. As yet another example, a Fast Fourier Transform (FFT) may be applied to the audio data interpreted as DSD-encoded data, and if energy is concentrated in the audio band (e.g., 20 Hz-20 kHz), then the audio data is likely DSD-encoded data but otherwise the audio data is likely PCM-encoded data. Autocorrelation check detector 614D may measure an autocorrelation of the bit which would be the most significant bit (MSB) if the audio data were PCM-encoded and a most lower weighted bit (e.g., the 15th bit). The detector 614D may determine if the autocorrelation is similar, and if so, determine that the audio data is likely DSD-encoded data but otherwise is likely PCM-encoded data. The detector 614D may also or alternatively apply autocorrelation to an entire PCM-interpreted sample and a bit-reversed version of the same and if the reversal has a much weaker autocorrelation, then the audio data is likely PCM-encoded data but otherwise is likely DSD-encoded data. Playback performance metric detector 614E may determine whether the audio data decoded as PCM- or DSD-encoded data produces a zero-crossing frequency consistent with audio output data or whether the audio data decoded as PCM- or DSD-encoded data meets some other performance parameter (e.g., signal-to-noise ratio, minimum volume, etc.).

Other detectors not described herein may be represented by other detector 614F, such as a detector that determines if a density limit of 1s and 0s for DSD data is exceeded, thus indicating the audio data is PCM encoded. As another example, a detector may identify DSD-encoded data that is muted because muted DSD-encoded data comprises a strict 50/50 ratio for 1's and 0's unlikely to be found in PCM-encoded data. As a further example, a zero-cross frequency check detector may apply hysteresis to PCM-interpreted audio data cross checks, and if a zero crossing occurs more frequently than approximately one-quarter of the time, then the audio data is likely DSD-encoded data but otherwise is likely PCM-encoded data. As yet another example, a zero-cross frequency check detector may apply decimation and hysteresis to DSD-interpreted data, and if a zero crossing occurs more frequently than approximately one-quarter of the time, then the audio data is likely PCM-encoded data but otherwise is likely DSD-encoded data. As still a further example, a neural network detector may apply a neural network or other machine learning algorithm to the audio data to determine when the audio data is likely to be PCM- or DSD-encoded data. As another example, a sample rate detector may determine a sample rate (or a clock speed) of the audio data to determine whether the audio data is likely to be PCM- or DSD-encoded data.

Figure 7:
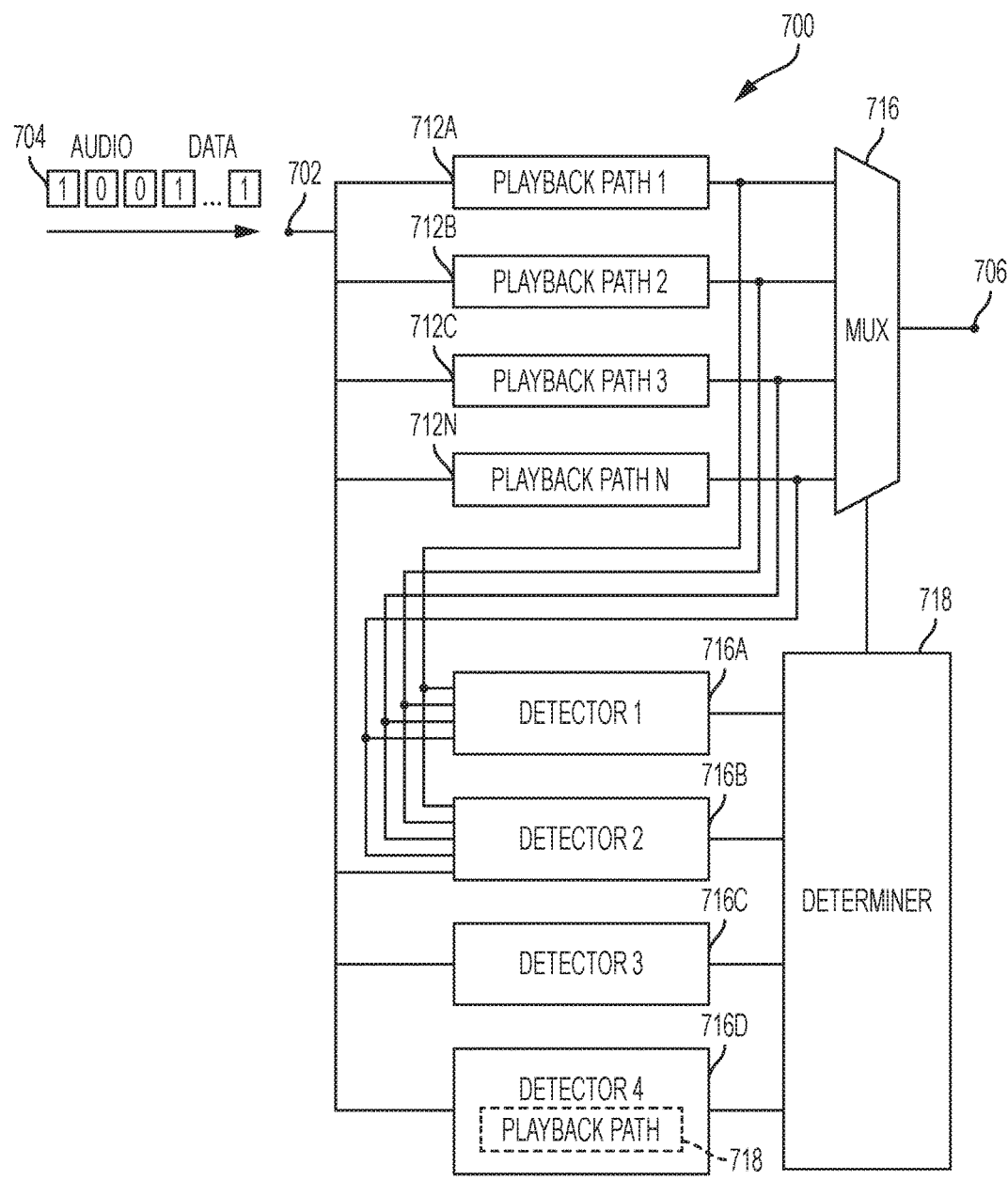
FIG. 7 is a block diagram of a system for determining data encoding, in which the diagram illustrates various detector configurations possible for a detection system, according to some embodiments of the disclosure.

All of the detector configurations shown in prior systems receive the audio data as an input. However, other detector configurations may receive different inputs as described with reference to FIG. 7. FIG. 7 is a block diagram of a system for determining data encoding, in which the diagram illustrates various detector configurations possible for a detection system, according to some embodiments of the disclosure. A system 700 may receive audio data 704 at input node 702. The audio data 704 may be provided to playback paths 712A-N to decode the audio data 704. The output of the playback paths 712A-D may be provided to multiplexer 716, which selects one of the playback paths 712A-D for output node 706. The multiplexer 716 selects one of the playback paths 712A-N based on an output of the determiner 718. The determiner 718 selects the playback path based on outputs from the detectors 716A-D.

The detectors 716A-D may receive one or more inputs that are evaluated to determine an encoding the audio data 704. The detector 716A may receive decoded audio data from one or more of the playback paths 712A-N. An example detector that may be configured similar to detector 716A is a playback performance metric detector. The detector 716A may examine aspects of the decoded audio to determine, based on those aspects, a likely encoding for the audio data 704. The detector 716B may receive decoded audio data from one or more of the playback paths 712A-N and the audio data 704. The detector 716B may examine aspects of the decoded audio and the audio data 704 to determine, based on those aspects, a likely encoding for the audio data 704. The detector 716C may receive the audio data 704. The detector 716B may examine aspects of the audio data 704 to determine, based on those aspects, a likely encoding for the audio data 704. An example detector that may be configured similar to detector 716C is a common data pattern detector. The detector 716D may receive the audio data 704 and include an integrated playback path 718. The detector 716D may process the audio data 704 through the integrated playback path 718 and examine aspects of the audio data 704 and/or processed audio data to determine, based on those aspects, a likely encoding of the audio data 704. An example detector that may be configured with an integrated playback path similar to detector 716D is the playback performance metric detector.

The determiner 718 may determine an encoding of the audio data 704 based on the outputs of the detectors 716A-D. Each of the detectors 716A-D may not be equally likely to correctly determine the encoding of the audio data 704. Thus, the determiner 718 may apply different weights to the outputs of the detectors 716A-D when determining the encoding of the audio data 704. One example of such a weighted determiner is described with reference to FIG. 8.

Figure 8:
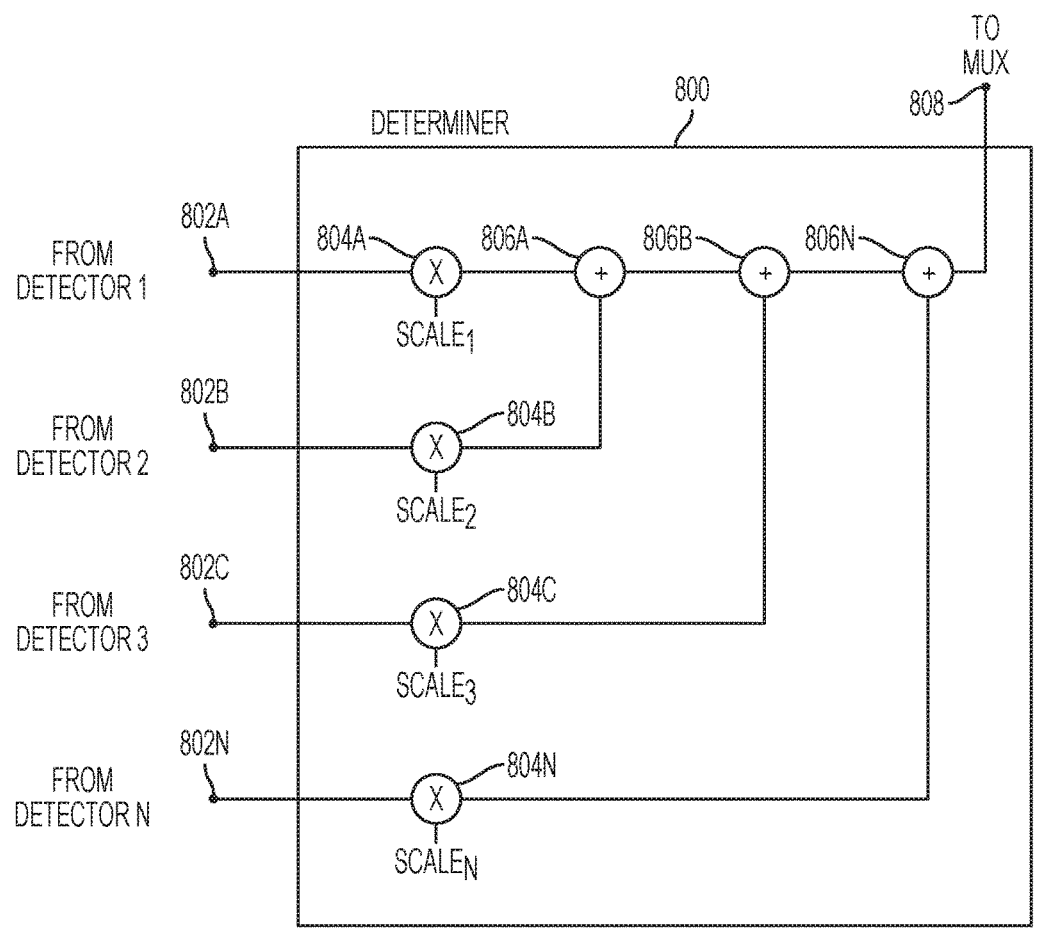
FIG. 8 is a block diagram of a determiner for determining a data encoding using weighted values according to some embodiments of the disclosure.

FIG. 8 is a block diagram of a determiner for determining a data format using weighted values according to some embodiments of the disclosure. A determiner 800 may receive inputs from each of the detectors at input nodes 802A-N. The inputs may be, for example, values indicating an encoding type, such as a logic '1' value for DSD encoded data and a logic '0' value for PCM encoded data. The detectors may alternatively output a trinary state or a real-valued number. The input values may be applied to scalers 804A-N, which are scaled by weights $scale_1$-$scale_N$. Some weights may be predetermined values programmed into the determiner 800. Some weights may be values determined based on historical accuracy of each of the detectors in producing correct determinations. Some weights may be adjusted based on a machine learning algorithm. Some weights may be adjusted based on a confidence value reported from a detector corresponding to one of the inputs 802A-N to the determiner 800. For example, each of the detectors may provide two values to the determiner 800, a determination and a confidence value in that determination. The determiner 800 may weigh the determination based on the confidence value. The output of the scalers 804A-N may be added in summers 806A-N. An output of the summed weighted determinations may be provided to output node 808, which may be a value for operating a multiplexer that selects between playback paths. For example, the value at output node 808 may toggle a multiplexer between a DSD playback path and a PCM playback path.

During the beginning of audio playback, the determiner may be unable to determine an encoding of the audio data. For example, some of the detectors may require a minimum amount of data before the detector can make a determination or may require a minimum amount of data before the detector can make a determination with a reasonable confidence level. For example, a frequency-domain characteristic detector may not be able to make a determination regarding audio data until an introductory quiet period of a music file has passed. As another example, a playback performance metric detector may not be able to make a determination until a minimum number of frames of audio data have been decoded. When the wrong playback path is chosen, the audio playback path may generate undesirable sounds, such as clicks, pops, or static. The determiner may mute the audio playback paths to prevent these undesirable sounds during this time period when the detectors are unable to make a determination regarding certain aspects of the audio data or cannot make a determination with a high level of confidence. One example method for operating a playback path selector with mute capability is shown in FIG. 9.

Figure 9:
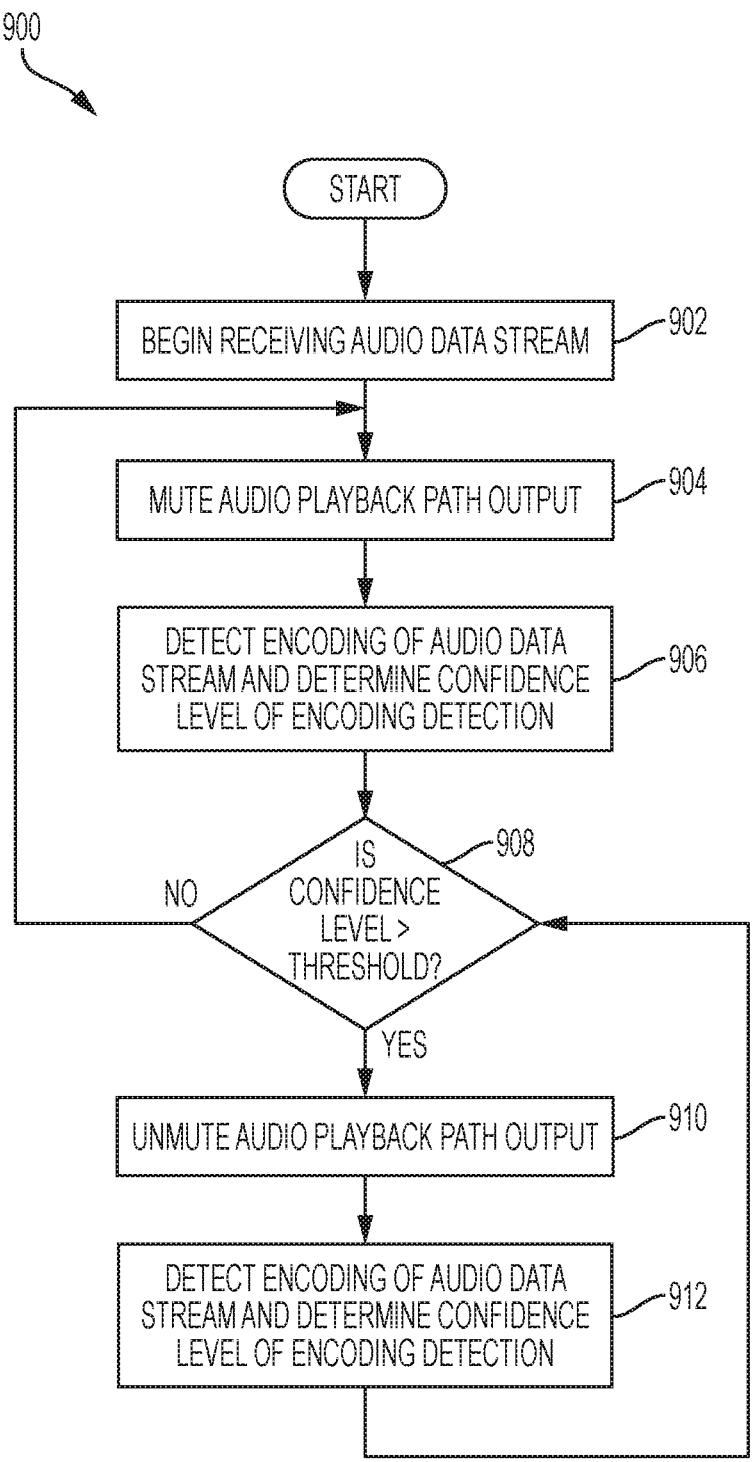
FIG. 9 is a flow chart illustrating an example method for determining data format and muting playback when the data encoding is undetermined according to some embodiments of the disclosure.

FIG. 9 is a flow chart illustrating an example method for determining data format and muting playback when the data format is undetermined according to some embodiments of the disclosure. A method 900 may begin at block 902 with receiving an audio data stream. Block 902 may occur when an electronic device starts up, when a smart phone begins a telephone call, when a personal media player begins a music file, when an audio system begins a video file, or the like. At block 904, the audio playback path output may be muted to prevent reproduction of sound from the audio data. For example, referring to FIG. 6, playback may be muted by signaling the multiplexer 616 to select neither of the playback paths 612A-B, playback may be muted by controlling the playback paths 612A-B, playback may be muted by turning off a switch coupled to the output node 606, playback may be muted by decreasing gain of an amplifier coupled to the output node 606, or a combination thereof. Referring back to FIG. 9, at block 906 after muting the playback path output, the encoding of audio data in the audio data stream may be determined and a confidence level in that determination calculated. Block 906 may include, for example, the determiner 618 receiving a plurality of determinations from detectors 614A-F and determining the encoding and a confidence level. At block 908, it is determined whether the confidence level in the encoding determination is above a threshold level. If not, the method 900 loops back to block 904 with maintaining a mute of the audio playback path and continuing to block 906 to detect encoding of the audio data until the confidence level reaches the threshold level at block 908.

When the confidence level reaches or exceeds the threshold level, the determiner may be reasonably confident that the output of an audio playback path is desirable audio sounds, such as speech or music. Thus, after the confidence level reaches the threshold level at block 908, the method 900 may continue to block 910 to select an audio playback path according to the determined encoding and unmute the selected audio playback path output. After unmuting, a selected audio playback path may decode the audio data to produce decoded audio, which may be output to other elements, such as a digital-to-analog converter (DAC), an amplifier, a filter, an equalizer, and eventually to a transducer, such as a speaker or headphones. During audio playback, the encoding determination may continue to be performed at block 912. If an encoding determination changes or becomes unsure by a confidence level dropping below the threshold level, the method 900 may return to block 904 to mute audio playback path output and wait for a determination of sufficient confidence level.

Muting the playback path is one technique for reducing undesired sounds that may be output to a user. However, other techniques may also or alternatively be used to reduce the reproduction of undesired sounds resulting from incorrectly determining the encoding of the audio data. For example, the audio data may be buffered a few frames or a few seconds in advance. The encoding determination may be performed on the buffered data, and then the correct encoding applied to the audio data for decoding the buffered data. When the amount of audio data buffered is greater than the amount of data required to determine the encoding of the audio data, the audio data encoding may be determined prior to any output reaching the transducer. In some embodiments, the audio data provided to the playback path may be buffered to produce a delay, while unbuffered or undelayed audio data is provided to the plurality of detectors. Thus, the determiner is provided time to determine the encoding based on outputs from the plurality of detectors prior to the audio data being decoded and output by an audio playback path.

The data encoding detection techniques and systems described herein may be used in devices configured to receive differently-encoded audio data over a common data bus. For example, electronic devices with media playback capabilities may play back high-definition and standard-definition music files, along with speech audio from voice recordings or telephone calls, through a shared audio playback path. The shared audio playback path would conventionally require a separate control channel or embedded headers to instruct the playback path regarding the encoding of the audio data being presented from memory or another source. However, the data encoding detection techniques and systems described herein eliminate the use of the extra information in control channels or headers as in the prior art. The resulting design and operation of the electronic device is simplified and costs can be reduced. One example of an electronic device incorporating the data encoding detection techniques and systems described herein is shown in FIG. 10.

Figure 1:
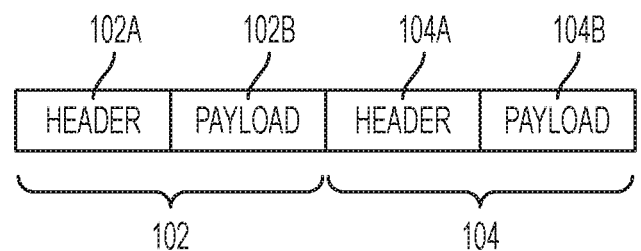
FIG. 1 is an illustration for a data format having a header attached to payloads according to the prior art.
Figure 2:
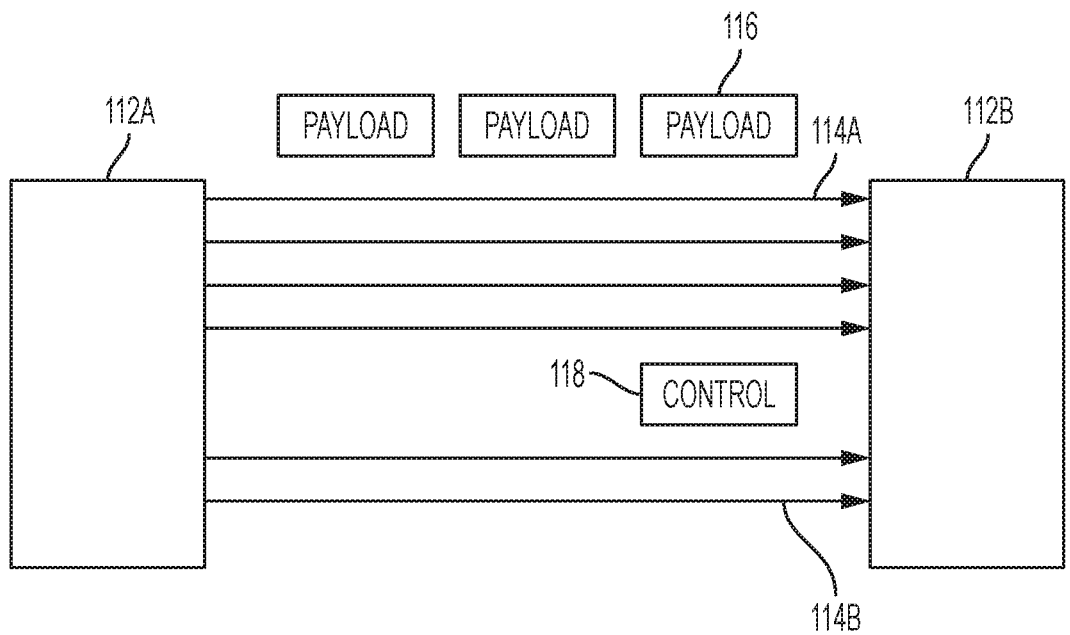
FIG. 2 is an illustration for a data format having control data attached to payloads according to the prior art.
Figure 10:
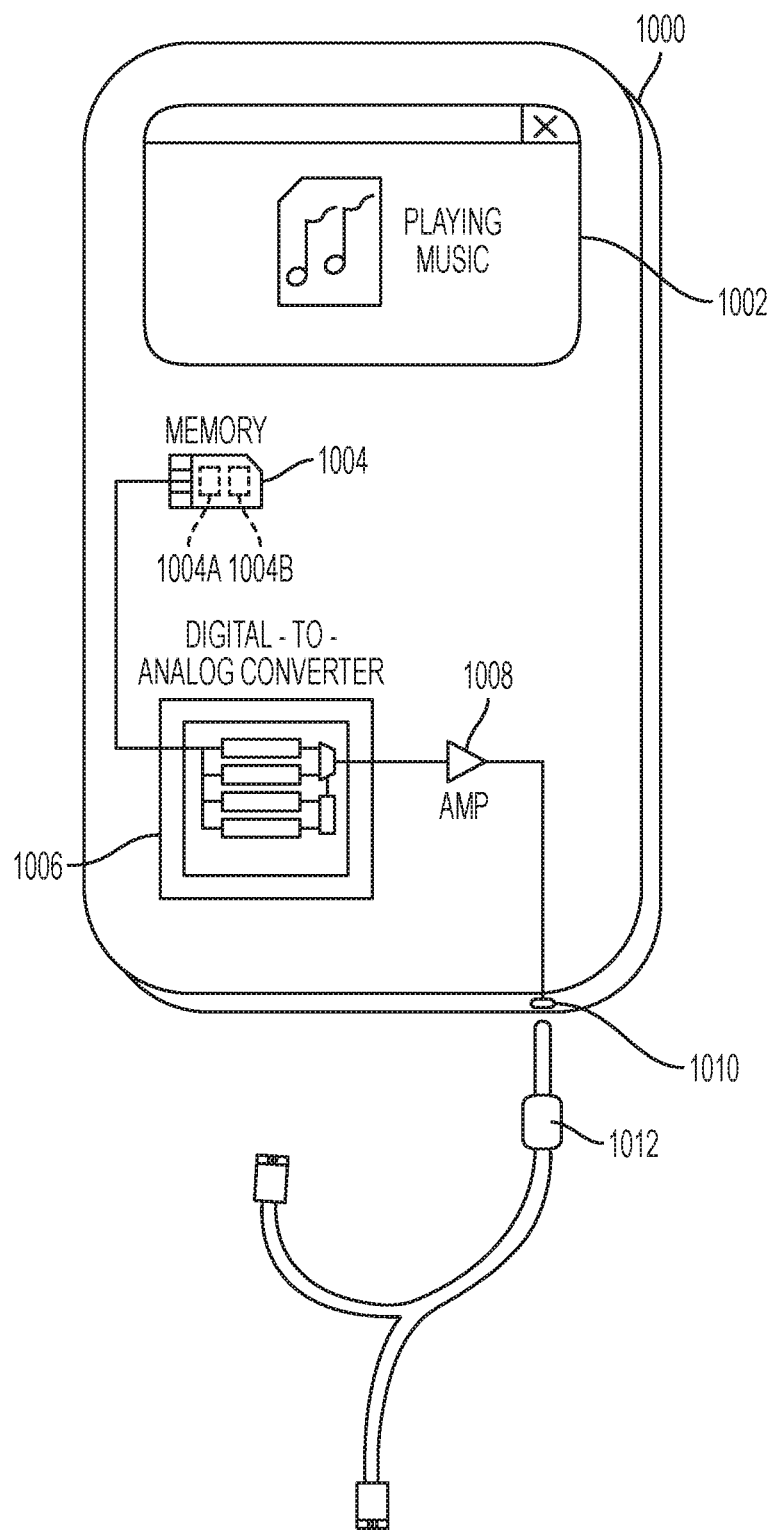
FIG. 10 is an example personal media device configured to playback audio using a digital-to-analog converter (DAC) that determines the data encoding using characteristics of the audio data and without dedicated information regarding the data format according to some embodiments of the disclosure.

FIG. 10 is an example personal media device configured to playback audio using a digital-to-analog converter (DAC) that determines the data format of the audio data using characteristics of the audio data and without dedicated information regarding the data format according to some embodiments of the disclosure. A personal media device 1000 may include a display 1002 for allowing a user to select from music files for playback, which may include both high-fidelity music files and normal music files. When high-fidelity music files are selected by a user, audio files may be retrieved from memory 1004 by an application processor (not shown) and provided to a digital-to-analog converter (DAC) 1006. The audio data stream may be provided to the DAC 1006 according to, for example, a PCM encoding or a DoP encoding (DSD over PCM). The DAC 1006 may include an encoding detection and determination system, similar to those described in the embodiments of FIG. 1 or FIG. 5. The DAC 1006, or other circuitry in the device 1000, may perform methods similar to those described in the embodiments of FIG. 3, FIG. 5, FIG. 6, or FIG. 7. The digital data retrieved from memory 1004 may be converted to analog signals by the DAC 1006, and those analog signals amplified by an amplifier 1008. The amplifier 1008 may be coupled to an audio output 1010, such as a headphone jack, for driving a transducer, such as headphones 1012, or a microspeaker (not shown) integrated with the personal media device 1000. Although the data received at the DAC 1006 is described as being received from memory 1004, the audio data may also be received from other sources, such as a USB connection, a device connected through Wi-Fi to the personal media device 1000, a cellular radio, an Internet-based server, another wireless radio, and/or another wired connection.

The schematic flow chart diagrams of FIG. 4 and FIG. 9 are generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The operations described above as performed by a controller may be performed by any circuit configured to perform the described operations. Such a circuit may be an integrated circuit (IC) constructed on a semiconductor substrate and include logic circuitry, such as transistors configured as logic gates, and memory circuitry, such as transistors and capacitors configured as dynamic random access memory (DRAM), electronically programmable read-only memory (EPROM), or other memory devices. The logic circuitry may be configured through hard-wire connections or through programming by instructions contained in firmware. Further, the logic circuitry may be configured as a general purpose processor capable of executing instructions contained in software. In some embodiments, the integrated circuit (IC) that is the controller may include other functionality. For example, the controller IC may include an audio coder/decoder (CODEC) along with circuitry for performing the functions described herein. Such an IC is one example of an audio controller. Other audio functionality may be additionally or alternatively integrated with the IC circuitry described herein to form an audio controller.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, although analog-to-digital converters (ADCs) are described throughout the detailed description, aspects of the invention may be applied to the design of other converters, such as digital-to-analog converters (DACs) and digital-to-digital converters, or other circuitry and components based on delta-sigma modulation. As another example, although digital signal processors (DSPs) are described throughout the detailed description, aspects of the invention may be applied to execution of algorithms on other processors, such as graphics processing units (GPUs) and central processing units (CPUs). Further, although ones (1s) and zeros (0s) or highs and lows are given as example bit values throughout the description, the function of ones and zeros may be reversed without change in operation of the processor described in embodiments above. As another example, although processing of audio data is described, other data may be processed through the detectors and other circuitry described above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method, comprising:
   receiving an audio data stream;
   analyzing the audio data stream with a plurality of detectors configured to generate a corresponding plurality of determinations regarding the audio data stream, wherein each detector of the plurality of detectors generates a determination of an encoding for the audio data stream, wherein the step of analyzing the audio data stream with a plurality of detectors comprises analyzing frequency domain information of audio content of the audio data stream; and
   identifying the encoding of the audio data stream based, at least in part, on the plurality of determinations from the plurality of detectors, wherein the step of identifying the encoding of the audio data stream comprises identifying whether the audio data stream is single-bit encoded or PCM encoded.

2. The method of claim 1, wherein the step of analyzing the audio data stream with a plurality of detectors comprises analyzing the audio data stream for at least one common data pattern.

3. The method of claim 1, wherein the step of analyzing the audio data stream with a plurality of detectors comprises performing an autocorrelation check on the audio data stream.

4. The method of claim 1, wherein the step of identifying the encoding of the audio data stream comprises identifying a performance metric from a playback path decoding the audio data stream.

5. The method of claim 1, wherein the step of identifying the encoding of the audio data stream comprises applying a voting scheme to the plurality of determinations to identify the encoding of the audio data stream.

6. The method of claim 5, wherein the step of applying the voting scheme comprises:
assigning a corresponding plurality of weight values to each of the plurality of determinations, wherein the plurality of weight values are proportional to a confidence level of each of the corresponding plurality of detectors generating the respective plurality of determination; and
identifying the encoding of the audio data stream by summing together the plurality of determinations adjusted by the assigned corresponding plurality of weight values.

7. The method of claim 5, wherein the step of applying the voting scheme comprises identifying the encoding of the audio data stream by determining a majority outcome of the plurality of determinations.

8. The method of claim 1, further comprising selecting a playback path for generating an output signal for the audio data stream based on the step of identifying the encoding of the audio data stream.

9. The method of claim 1, further comprising unmuting a playback of the audio data stream after identifying the encoding of the audio data stream.

10. An apparatus, comprising:
an audio controller configured to perform steps comprising:
receiving a plurality of determinations from a corresponding plurality of detectors, wherein each of the plurality of determinations corresponds to a determination of an encoding for an audio data stream determined by analyzing frequency domain information of audio content of the audio data stream;
identifying the encoding of the audio data stream based, at least in part, on the plurality of determinations from the plurality of detectors, wherein the step of identifying the encoding of the audio data stream comprises identifying whether the audio data stream is single-bit encoded or PCM encoded; and
selecting a playback path from a plurality of playback paths for output to a transducer based, at least in part, on the identified encoding of the audio data stream.

11. The apparatus of claim 10, wherein the step of analyzing the audio data stream with a plurality of detectors comprises analyzing the audio data stream for at least one common data pattern.

12. The apparatus of claim 10, wherein the step of analyzing the audio data stream with a plurality of detectors comprises performing an autocorrelation check on the audio data stream.

13. The apparatus of claim 10, wherein the step of identifying the encoding of the received audio data comprises identifying a performance metric from a playback path decoding the audio data stream.

14. The apparatus of claim 10, wherein the step of identifying the encoding of the audio data stream comprises applying a voting scheme to the plurality of determinations to identify the encoding of the audio data stream.

15. The apparatus of claim 14, wherein the step of applying the voting scheme comprises:
assigning a corresponding plurality of weight values to each of the plurality of determinations, wherein the plurality of weight values are proportional to a confidence level of each of the corresponding plurality of detectors generating the respective plurality of determination; and
identifying the encoding of the audio data stream by summing together the plurality of determinations adjusted by the assigned corresponding plurality of weight values.

16. The apparatus of claim 14, wherein the step of applying the voting scheme comprises identifying the encoding of the audio data stream by determining a majority outcome of the plurality of determinations.

17. The apparatus of claim 10, wherein the processor is further configured to perform steps comprising unmuting a playback of the audio data stream after identifying the encoding of the audio data stream.

18. An apparatus, comprising:
an input node configured to receive an audio data stream;
a plurality of playback paths configured to playback the audio data stream based on a corresponding plurality of audio data encodings;
a plurality of detectors coupled to the input node and configured to analyze the audio data stream and generate a corresponding plurality of determinations of an encoding for the audio data stream for identifying whether the audio data stream is single-bit encoded or PCM encoded by analyzing frequency domain information of audio content of the audio data stream;
a selector circuit coupled to the plurality of playback paths and the plurality of detectors and configured to select an output of at least one of the plurality of playback paths based, at least in part, on the plurality of determinations from the plurality of detectors.

19. The apparatus of claim 18, wherein at least one of the plurality of detectors is configured to analyze the audio data stream for at least one common data pattern.

20. The apparatus of claim 18, wherein at least one of the plurality of detectors is configured to perform an autocorrelation check on the audio data stream.

21. The apparatus of claim 18, wherein at least one of the plurality of detectors is configured to identifying a performance metric from a playback path decoding the audio data stream.

22. The apparatus of claim 18, wherein the selector circuit is configured to:
apply a voting scheme to the plurality of determinations to identify the encoding of the audio data stream;
assign a corresponding plurality of weight values to each of the plurality of determinations, wherein the plurality of weight values are proportional to a confidence level of each of the corresponding plurality of detectors generating the respective plurality of determination; and
identify the encoding of the audio data stream by summing together the plurality of determinations adjusted by the assigned corresponding plurality of weight values.

23. The apparatus of claim 18, wherein the selector circuit is configured to perform steps comprising unmuting a playback of the audio data stream after selecting an output of at least one of the plurality of playback paths.

* * * * *